US007695858B2

(12) United States Patent
Ojanen et al.

(10) Patent No.: US 7,695,858 B2
(45) Date of Patent: Apr. 13, 2010

(54) BATTERY CONNECTOR

(75) Inventors: Seppo Ojanen, Pertteli (FI); Tero Suomalainen, Turku (FI); Aimo Leskela, Muurla (FI)

(73) Assignee: Nokia Corporation, Espoo (FI)

( * ) Notice: Subject to any disclaimer, the term of this patent is extended or adjusted under 35 U.S.C. 154(b) by 1218 days.

(21) Appl. No.: 11/025,041

(22) Filed: Dec. 29, 2004

(65) Prior Publication Data

US 2006/0141349 A1 Jun. 29, 2006

(51) Int. Cl.

| | |
|---|---|
| ***H01M 2/02*** | (2006.01) |
| ***H01R 4/28*** | (2006.01) |
| ***H01R 4/30*** | (2006.01) |
| ***H01R 33/08*** | (2006.01) |
| ***H01R 13/10*** | (2006.01) |
| ***H01R 33/00*** | (2006.01) |
| ***H01R 11/22*** | (2006.01) |

(52) U.S. Cl. ....................... 429/178; 439/754; 439/755; 439/224; 439/682; 439/660; 439/856

(58) Field of Classification Search ................. 429/178; 439/224, 660, 682, 755, 754, 856
See application file for complete search history.

(56) References Cited

U.S. PATENT DOCUMENTS

| | | | | |
|---|---|---|---|---|
| 6,551,143 | B2 | 4/2003 | Tanaka et al. | 439/682 |
| 6,974,344 | B2 * | 12/2005 | Comerci | 439/329 |

* cited by examiner

*Primary Examiner*—Patrick Ryan
*Assistant Examiner*—Helen O Conley
(74) *Attorney, Agent, or Firm*—Perman & Green LLP

(57) ABSTRACT

A battery pack including a cell unit containing at least one cell and a contact unit connected to the cell unit. The contact unit includes a housing containing connector parts for connection to external complementary connector parts and conductors electrically connecting the connecting parts to the at least one cell.

5 Claims, 9 Drawing Sheets

BATTERY CONNECTOR

BACKGROUND OF THE INVENTION

1. Field of the Invention

The present invention relates to battery connectors.

2. Brief Description of Related Developments

Traditionally, battery contacts in electronic devices, such as cell phones, are connected to battery cell using large amounts of solder. This provides a strong contact. However, in order to increase the strength, the soldered connections are made as large as possible.

An example of this type of connection is described in U.S. Pat. No. 6,551,143. The connector in this document is designed to have a large surface area at the soldering point to increase the strength of the connection. The connector is soldered to a circuit board that is then connected to the battery.

However, by increasing the soldered connection, the battery pack size increases. This is undesirable as there is a need to make electronic devices as small as possible.

Moreover, it is often the case that the battery design changes with the design of the cell phone. This is because each battery is designed to fit into a certain cell phone. Therefore, a large number of different batteries need to be sourced and stocked by cell phone manufacturers. This is expensive.

It is therefore desirable to further increase the strength of battery connectors whilst minimizing overall battery size and also to allow a degree of freedom in the design of cell phones so that bespoke battery design is not required.

SUMMARY OF THE INVENTION

It should be noted that the battery may comprise a number of different battery cells which may be connected together. The battery cells are then encapsulated in a housing to form a single battery. The assembly is then connected to the battery to form an integrated battery and connector unit. This unit can then be mounted in appropriate devices.

BRIEF DESCRIPTION OF THE DRAWINGS

The invention will now be described, by way of example only and with reference to the following drawings, in which.

Figure 7:
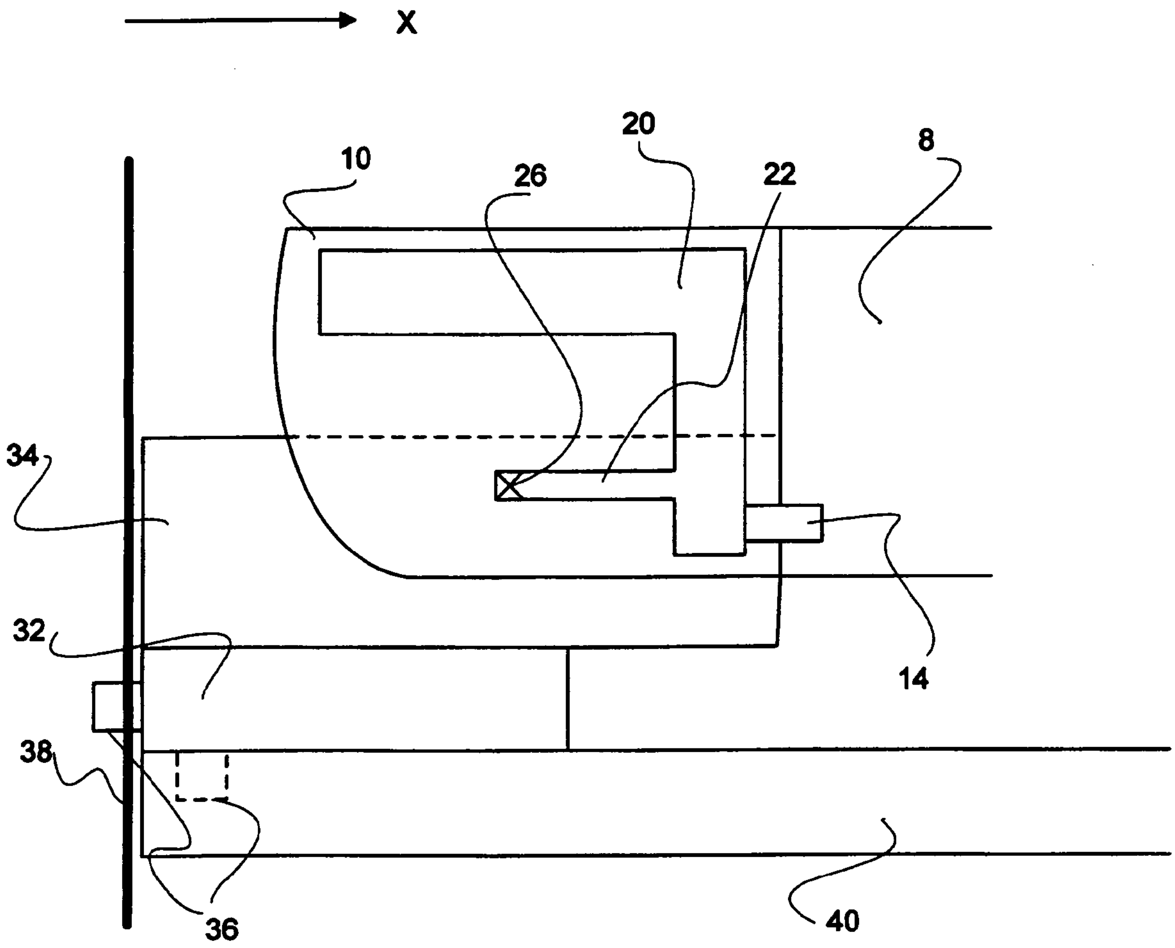
Figure 8:
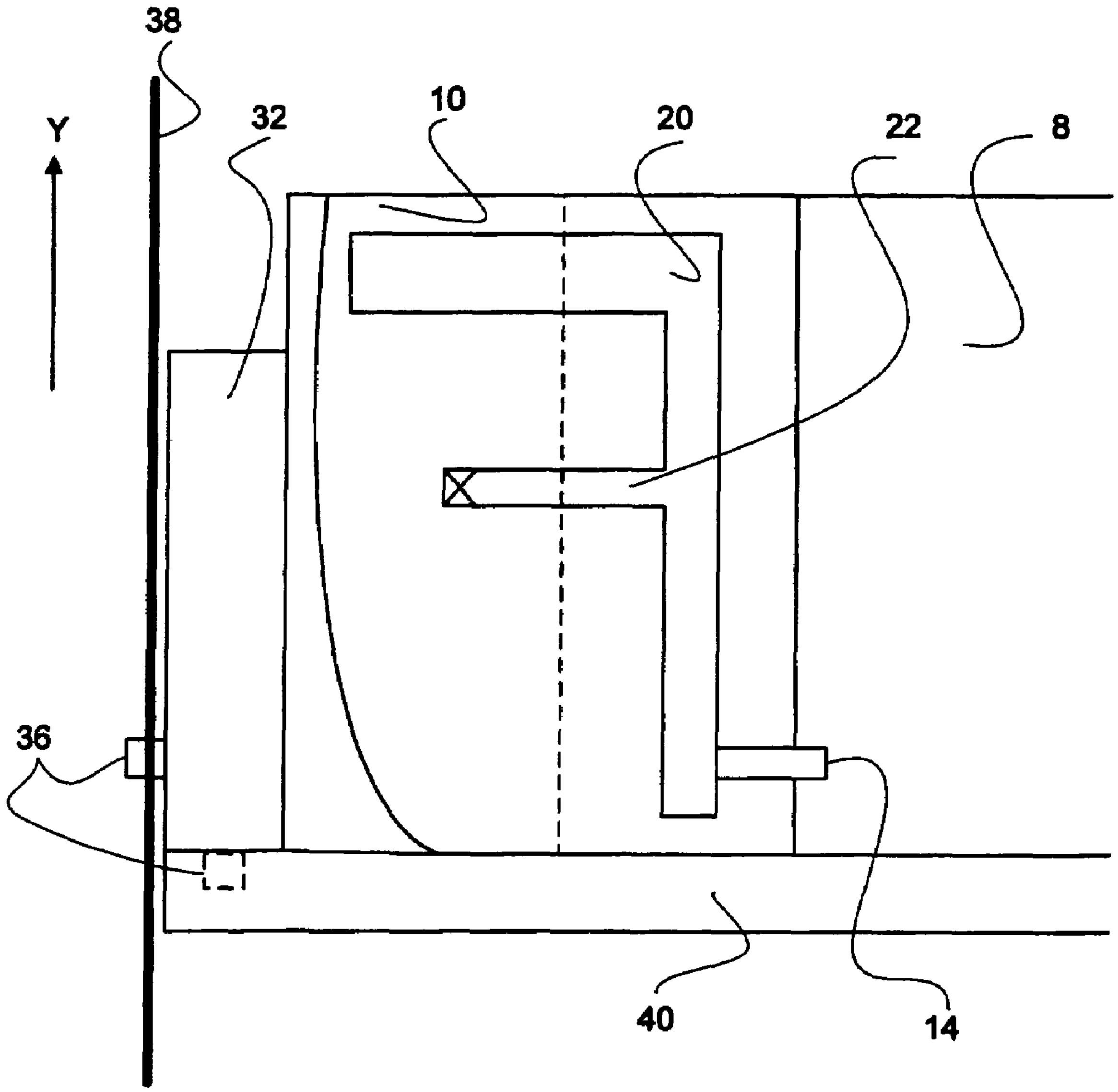

FIGS. **6*a* and 6*b*** are front, perspective, views of a circuit board contact which is mounted on the cell phone in a vertical and horizontal orientation, respectively;

FIG. 7 is a side elevation view, taken as a cross section, of the circuit board contact when engaged with the battery assembly according an embodiment of the present invention; and FIG. 8 is a side elevation view, taken as a cross section, of the circuit board contact when engaged with the battery assembly according to a further embodiment the present invention.

DETAILED DESCRIPTION OF THE PREFERRED EMBODIMENT(S)

The described exemplary embodiments are intended to assist the understanding of the invention and are not intended to limit the scope of the invention in any way. Like reference numerals in the Figures represent like features unless otherwise stated.

Figure 1:
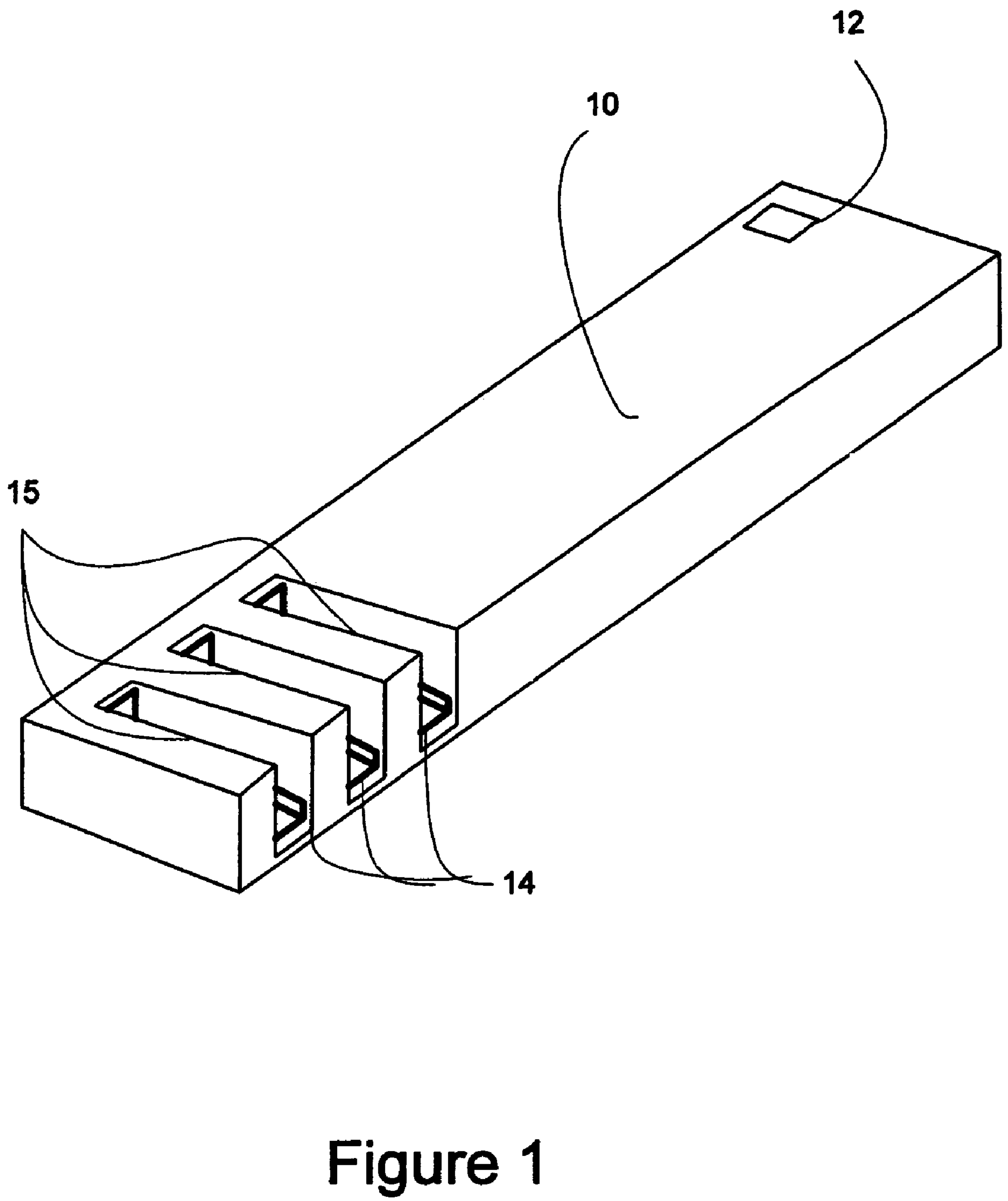
FIG. 1 is a front, perspective, view of a battery assembly according to the invention.

Referring to FIG. 1, an assembly 10 is formed of a suitable non-conductive, strong, material such as a plastic or an insulating resin. The assembly 10 has three slots 15 located along a portion of the length of the assembly 10. The position of the assembly 10 is such that it can engage a respective male contact located on the cell phone. Each slot 15 has a contact 14 located therein. Each slot 15 forms a recess in the assembly 10 which allows connection of a male connector. Each slot 15 has two side walls, a back wall and a floor to accommodate the respective contact 14 located therein. Accordingly, the slot 15 has two surfaces, perpendicular to one another, missing so that the male connector, located on the cell phone will be able to engage the contact 14.

A support member 12 is located in the assembly 10 to increase the strength when the assembly 10 is integrated with a battery 8. The battery 8 and the assembly 10 form a slab-like structure.

Figure 2:
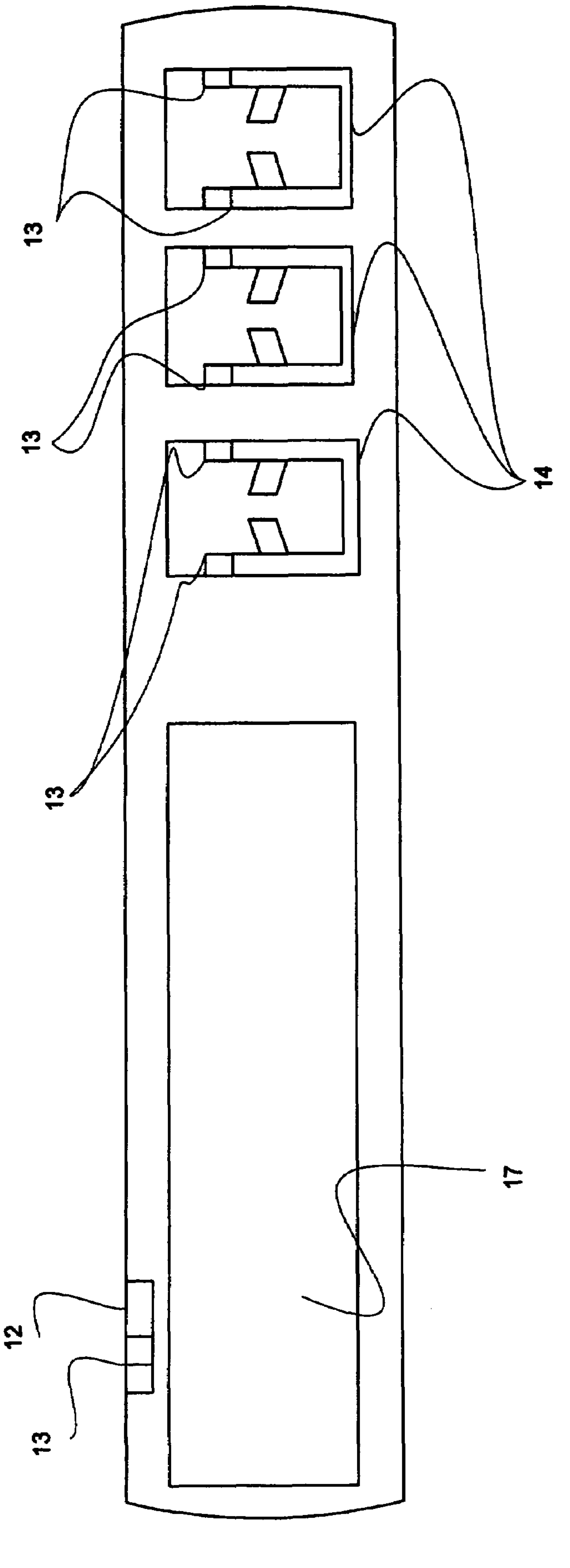
FIG. 2 is a rear view of the battery assembly according to the invention with no cover.

Referring to FIG. 2, each contact 14 and the supporting member 12 include protrusions 13. The protrusions 13 extend rearwards from the back of the assembly 10 and are connectable to the battery 8. The skilled person will appreciate that the battery 8 may be composed of a number of individual [battery] cells held together in a single package by a battery sheath or other covering. However, this sheath is not essential. Moreover, the battery 8 may also comprise only a single cell.

Figure 3:
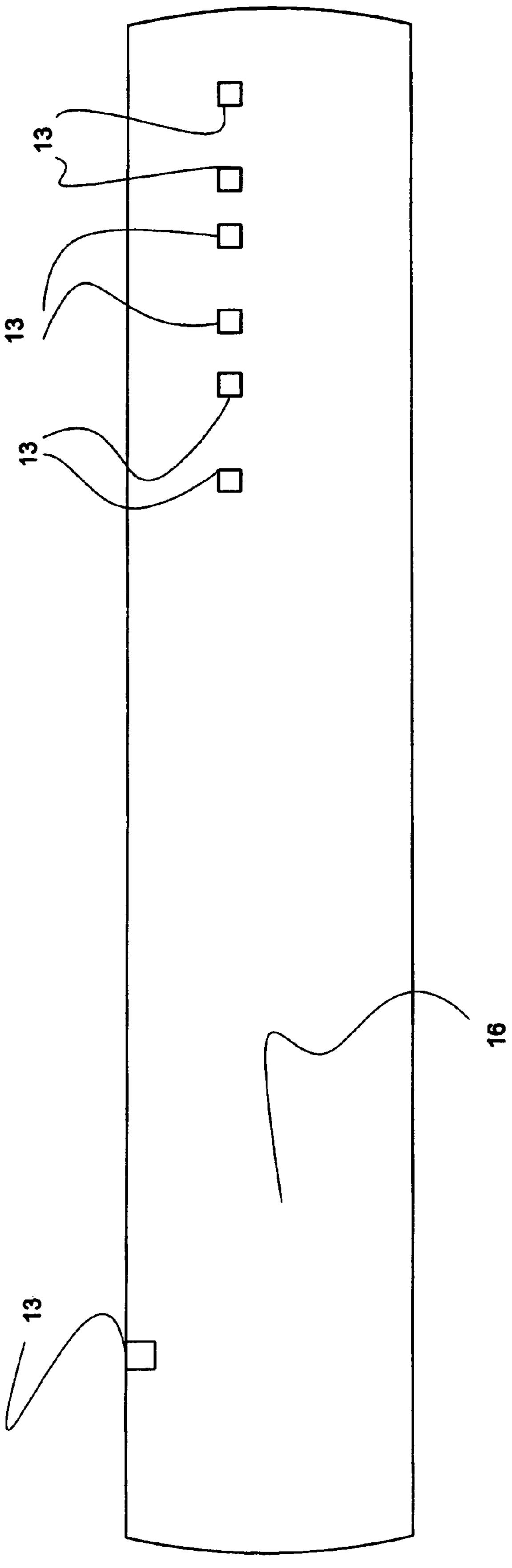
FIG. 3 is a rear view of the battery assembly according to the invention with cover present.

FIG. 3 shows the view of FIG. 2 with a protective cover 16 positioned over the back of the assembly 10. The cover 16 protects the contacts and ensures that during connection to the battery 8, each contact 14 and supporting member 12 is not damaged. The protective cover 16 has holes (not specifically shown) through which the protrusions 13 extend. The protective cover 16 forms the back wall of the slots 15.

Figure 4:
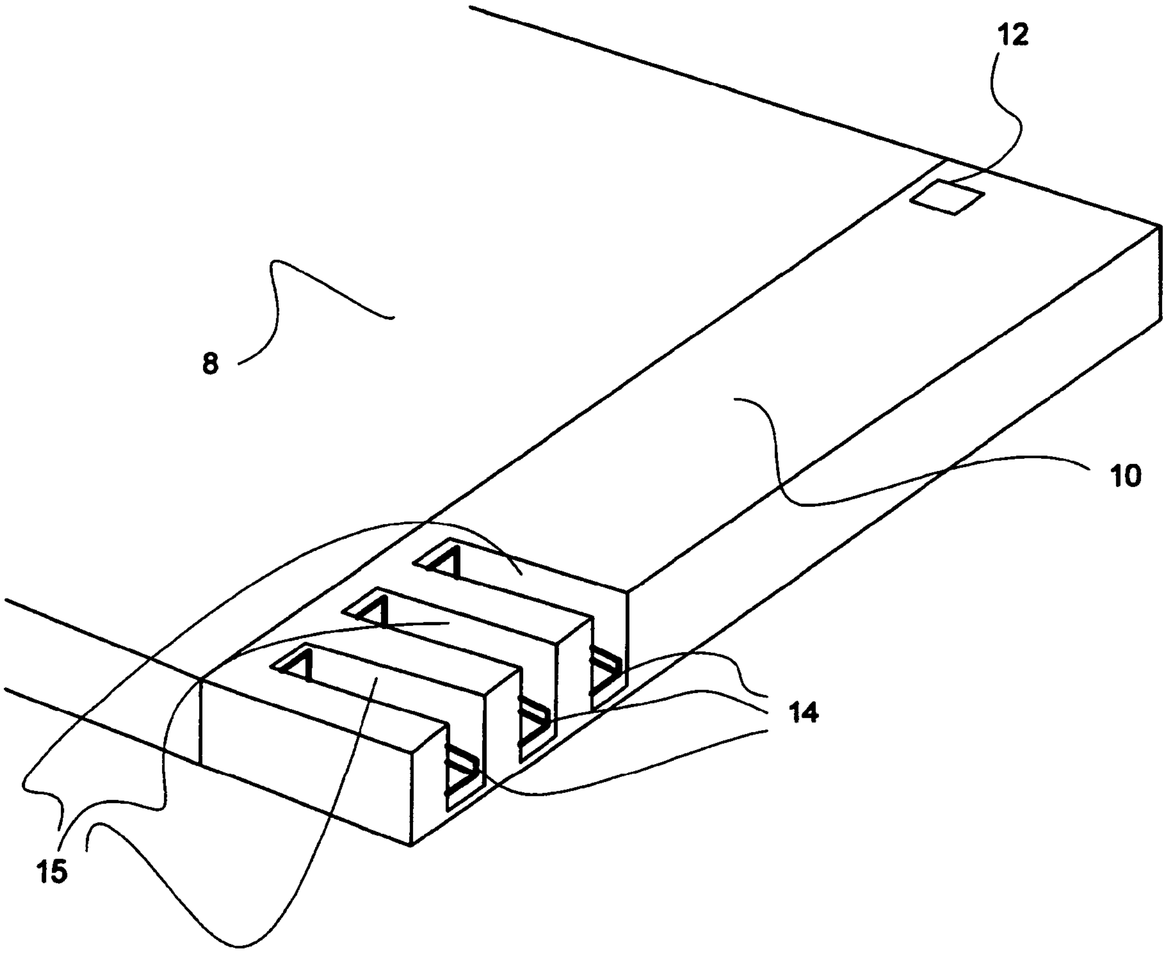
FIG. 4 is a front, perspective, view of the battery assembly according to the present invention connected to a battery cell.

Referring to FIG. 4, the protrusions 13 extending from the rear of the front assembly 10 are soldered onto the battery 8. This connects the assembly 10 to the battery 8 and thus integrates the contacts 14 with the battery cell 8. The process of soldering the protrusions 14 to the battery 8 is well known and will not be described hereinafter.

Figure 5:
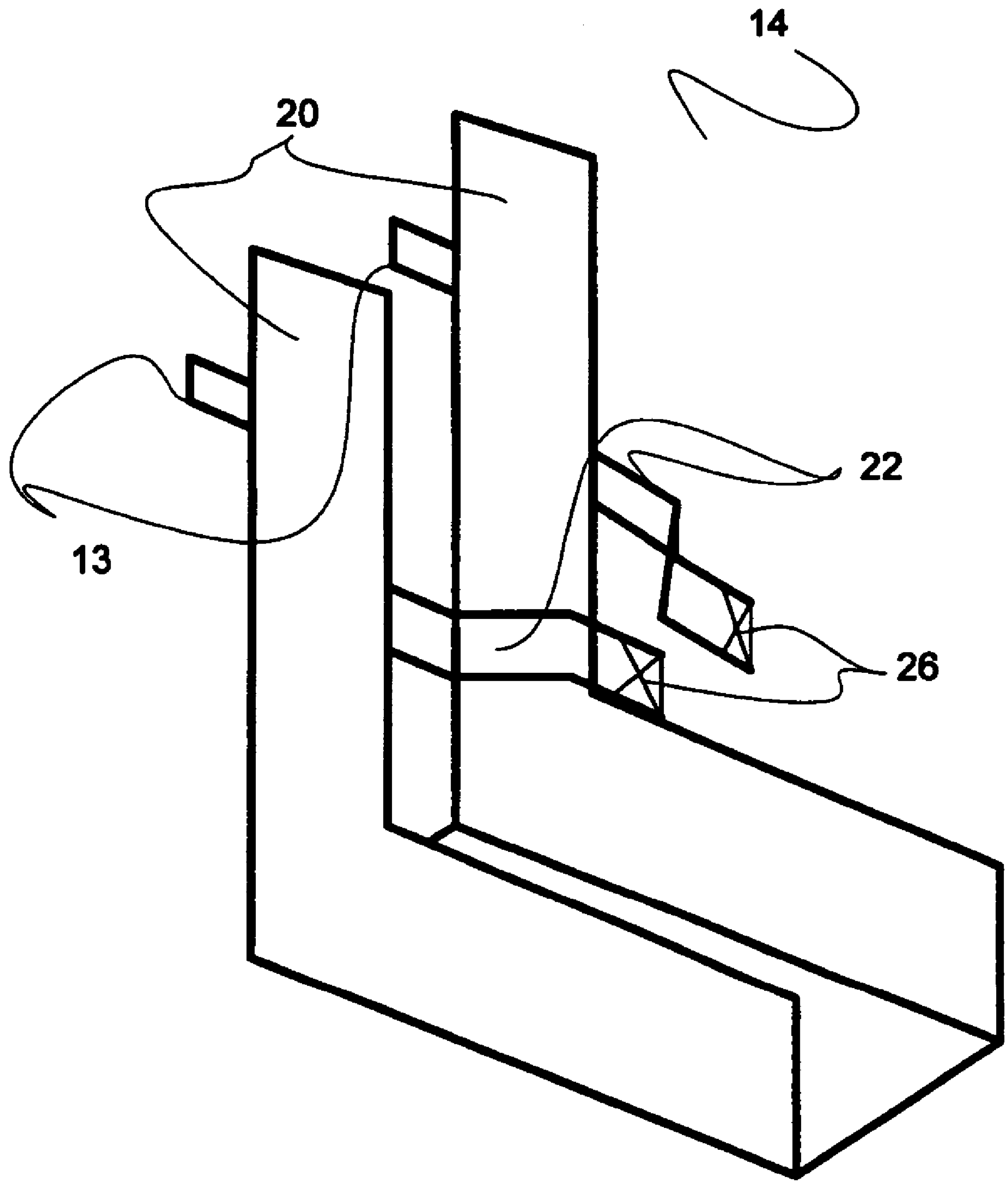
FIG. 5 is a perspective view of a connector used in the battery assembly according to the invention.

Referring to FIG. 5, the contact 14 is formed from sheet metal which is bent into shape. The contact 14 has two vertical parallel pieces 20 each of which has the protrusion 13 horizontally extending from an edge. Extending perpendicularly from an edge of each vertical piece 20 different to the protrusion 13, is a resilient arm 22 which is bent at an incline towards the other vertical piece 20. The resilient arm 22 has a grip 26 facing the opposite vertical piece 20. The grip 26, in this case, is an 'X' shape stamped into the metal. However, other configurations may equally be used such as a dome shape. Consequently, as the two vertical pieces 20 are placed in parallel with one another, the grips 26 are forced together by the incline. Therefore, the grips 26 abut each other and are pressed together.

The bottom edge of the vertical pieces 20 are connected together to provide rigidity. The connected bottom edges abut the floor of the slots 15 in use. Moreover, it is preferable that the contact 14 is press-fit into the slot 15. Accordingly, it is preferable that the distance between the vertical pieces 20 is such that when located within the slot 15, the contacts 14 are held firmly within the slot 15.

Figure 6A:
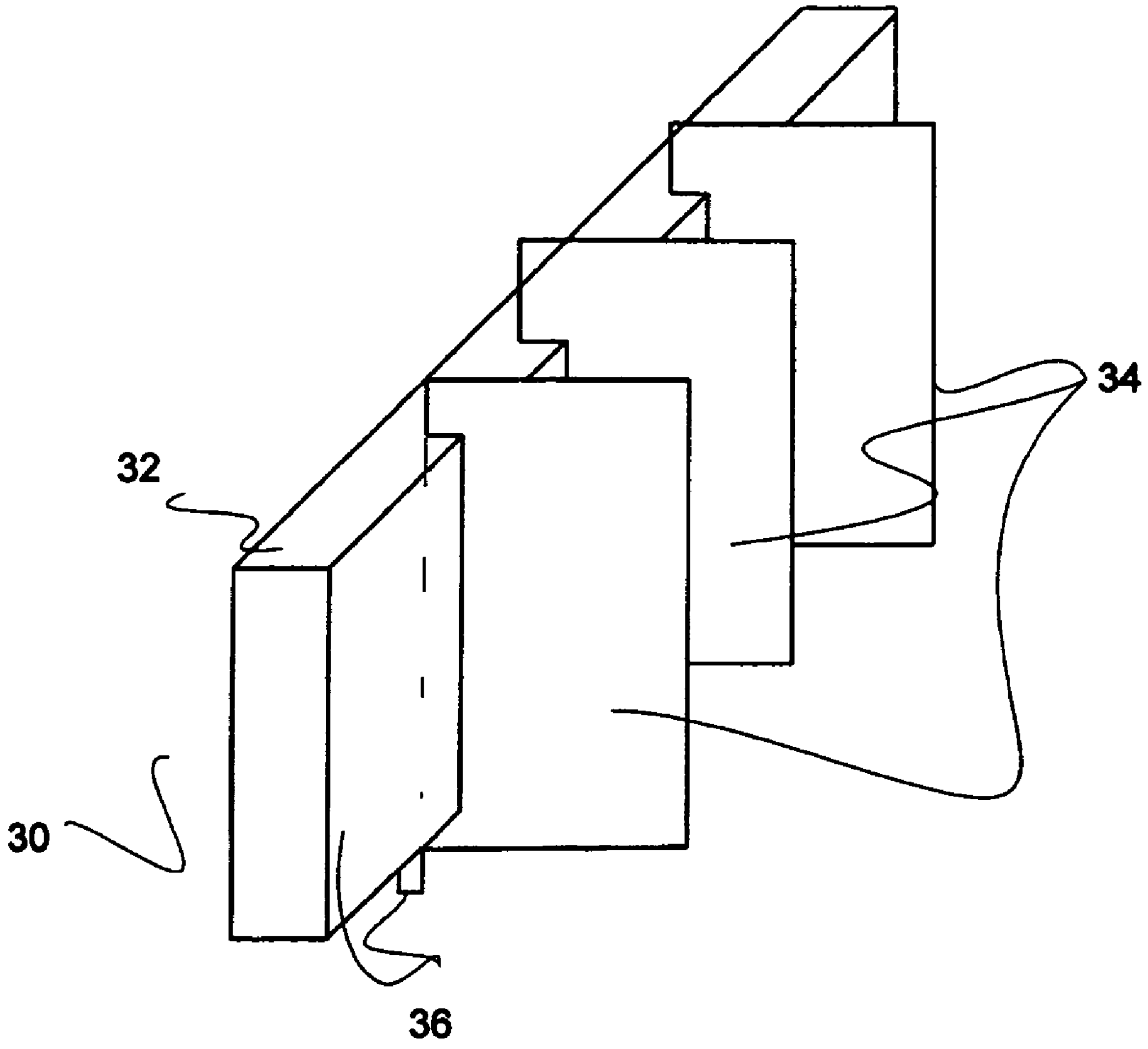
Figure 6B:
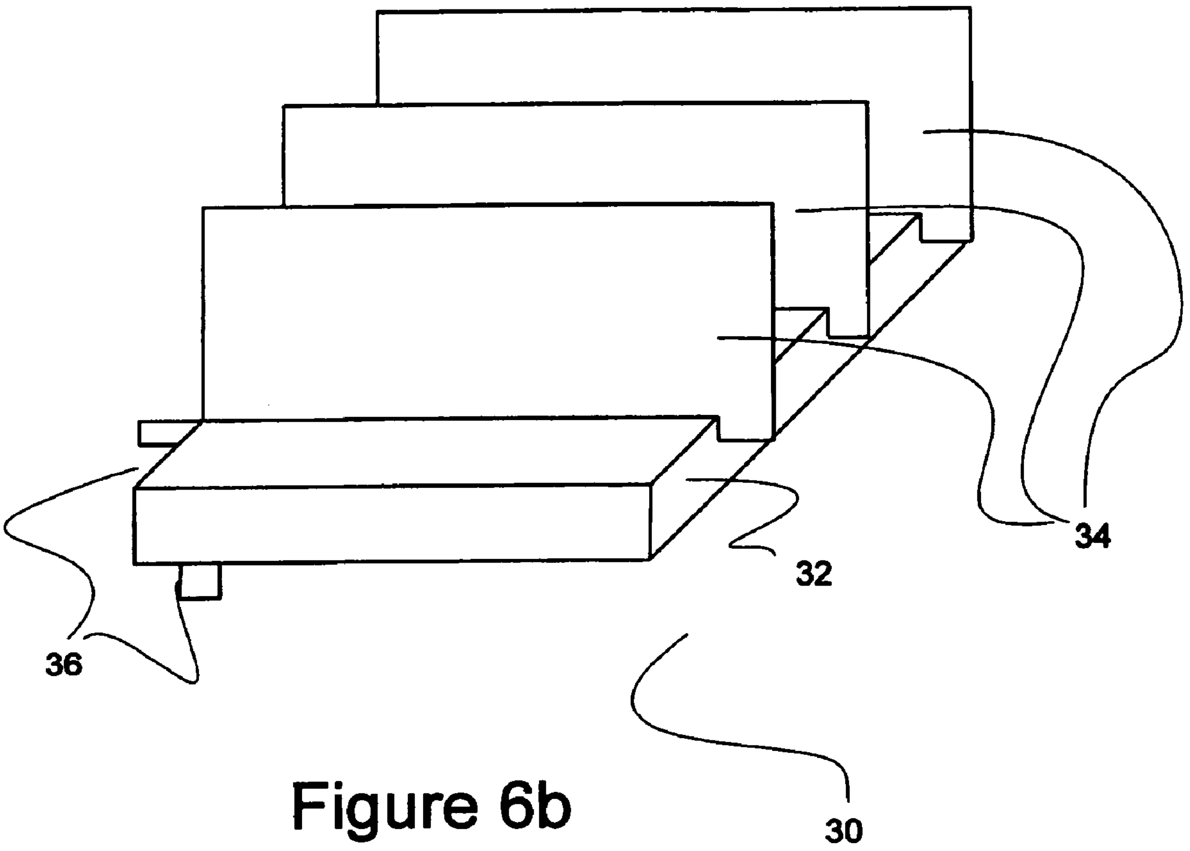

Referring to FIGS. 6*a* and 6*b*, the contact 14 located in the slot 15 integral with the battery engages a circuit board contact 30. The circuit board contact 30 is formed of a base 32 onto which three male contacts 34 are located. The male contacts 34 extend vertically from the base 32 and are preferably partly located within the base 32 to increase the rigidity, and strength of the male contacts 34.

Moreover, it is preferable that the male contacts 34 are knife connectors. However, other shaped male connectors are also applicable. If knife connectors are used, it is further preferable that the battery thickness is 3.5 mm or less.

It is also preferable that one of the vertical edges of each male contact 34 is flush with one edge of the base 32 and that the other vertical edge of the male contact 34 extends beyond the base 32, and is longer than the width and/or height of the side wall of the slot 15. As will be explained hereinafter, the combination of the length of the male contacts 34 and the width and/or height of the side wall of the slot 15 determines the displacement of the battery within a battery cavity 38.

Each of the male contacts 34 includes an interface protrusion 36. The interface protrusion 36 extends out of the base 32 in both the horizontal and vertical direction i.e. in parallel and perpendicular to the plane of the base 32. This allows the circuit board contact 30 to be located horizontally or vertically with respect to the contact 14 located in the slot 15 of the assembly 10. The respective interface protrusion 36 (either horizontal or vertical) is soldered onto a circuit board 40 depending on orientation of the circuit board contact 30. In this case, the circuit board 40 has a hole in which the interface protrusion 36 sits. It should be noted that the protrusion 36 is only a preferable type of contact and that a soldering pad may be equally used.

Referring to FIG. 7, the circuit board interface 30 is positioned horizontally on a circuit board 40. Consequently, the vertical interface protrusions 36 are soldered to the circuit board 40, with the horizontal interface protrusions 36 being left unconnected. The positioning of the circuit interface 30 is such that each male contact 34 engages with a respective contact 14 within the slots 15. Moreover, it is preferable that a hole be provided in the battery cavity 38 so that the unconnected interface protrusion can reside therein. This allows the circuit board interface 30 to sit flush with the battery cavity 38. When pressed into place, the incline in the resilient arms 22 produce a force which press the grips 26 together, thus holding the male contact 34 in place. Therefore, the electrical power contained in the battery 8 is coupled to the circuit board via the protrusion, the contact 14, the male contact and the interface protrusion. It will be appreciated that the contact 14 and/or male contact 34 used in the present invention may be of any shape and/or configuration, for example the contact 14 may be a spring. The only requirement is that the contact 14 and complementary contact 34 are able to engage one another.

It should be noted that when positioned horizontally, because the male contact 34 is, in this case longer than the width of the side wall of the slot 15, the battery is displaced a distance X away from the edge of the battery cavity 38. Clearly, if the length of the male contact 34 was altered, the displacement of the battery, i.e. the distance X, would vary accordingly. The skilled person will understand that the dimensions of each slot 15 may be varied, whilst keeping the length of the male contact 34 constant to vary X. This would achieve the same result.

Referring to FIG. 8, the circuit board interface 30 is positioned vertically on the circuit board 40. Consequently, the horizontal interface protrusions 38 are soldered to the circuit board 40, with the vertical interface protrusions 36 being left unconnected. The positioning and operation of the contact is as explained with reference to FIG. 8.

When positioned vertically, because the male contact is as long, or longer than the slot 15, the battery is displaced a distance Y away from the circuit board 40. Clearly, if the length of the male contact was altered, the vertical displacement of the battery, i.e. the distance Y, would vary accordingly. The skilled person will understand that other approaches will vary the distance Y, for example, by altering the dimensions of each slot 15 whilst keeping the length of the male contact 34 constant.

By providing the ability to vary the displacement of the battery in the horizontal or vertical direction with respect to the cell phone, the design freedom of electronic devices is improved. For example, if the electronic device is a cell phone, by positioning the battery in this manner, the cover of the phone can be made flush with the surface to reduce the size of the cell phone. Moreover, by being able to adapt the position of a battery within an electronic device, the size of the battery becomes less important because the position of the battery can be altered depending on the device into which it is incorporated. This allows a single type of battery to be used in different devices thus increasing efficiency of the production of the electronic devices.

Experiments show that the overall volume of the battery cell and connectors falls from 10.65 $cm^3$ using known techniques to 10.39 $cm^3$ using the present invention. This provides a considerable weight and size reduction which is desirable.

The skilled person will appreciate that the present invention may be applied to electronic apparatus other than cell phones.

Although the foregoing is described with reference to vertical and horizontal orientations, the skilled person would appreciate that these are relative to the body of the cell phone and that the horizontal and vertical orientations will vary as the orientation of the cell phone varies.

It will be understood by those skilled in the art that the invention can be implemented in other specific forms without departing from the technical spirit or scope of the invention. Therefore, the foregoing embodiments are merely illustrative and are not limiting to the invention, the scope being limited by the appended claims. Moreover, all changes and/or modifications or their equivalents made within the meaning and scope of the claims should be construed as falling within the scope of the claims.

The invention claimed is:

1. A battery pack comprising:

a cell unit containing at least one cell; and a first contact unit integrally mounted on and electrically connected directly to the cell unit, said first contact unit further comprising:

a housing having multiple slots constructed therein; and a set of first contact elements mounted in each of the slots, said first contact elements constructed to receive second contact elements in electrical contact with said cell unit; and a second contact unit constructed to permit said second contact unit to be mounted on and connected to a circuit board in a battery cavity of an electronic appliance, the second contact unit having second contact elements constructed to engage the first contact elements in electrical contact;

wherein each of the slots are constructed comprising two adjoining sides and being open between the two adjoining sides to allow insertion of the second contact elements into the slot in first and second directions, said first and second directions being perpendicular to each other, and further the slot is dimensioned having a first depth in the first direction and a second depth in the second direction; and wherein the second contact elements are constructed with a length for entry between the open sides of the slot; and further wherein the length of the second contact elements is larger than the first or second depths of the slot, thereby permitting the alternate engagement of the first and second contact units to vary displacement of the cell unit from the circuit board in the first and second directions, while maintaining a secure connection.

2. The battery back according to claim 1, wherein the first contact unit is connected to the cell unit by means of a protrusion extending outward from the housing and constructed integrally with the first contact elements.

3. The battery pack according to claim 1, wherein the first contact elements are constructed with a pair of opposing resilient arms extending into the slot; and the second contact elements are shaped in the form of a blade for insertion between said resilient arms to form a secure connection.

4. The battery pack, according to claim 1, wherein the second contact unit further comprises a base, multiple blades imbedded in the base and extending outward therefrom, and a pair of interface protrusions constructed on said base and extending outward from the base in orthogonal directions, wherein one of said interface protrusions is connected to the circuit board depending on the orientation of the battery cavity.

5. The battery back according to claim 1, wherein the electronic appliance is a mobile communications device.

* * * * *